US006856432B2

(12) United States Patent
Bobrow et al.

(10) Patent No.: US 6,856,432 B2
(45) Date of Patent: Feb. 15, 2005

(54) SYSTEM AND METHOD FOR PROVIDING COMMUNICATIONS

(75) Inventors: Daniel Gureasko Bobrow, Palo Alto, CA (US); Larry Melvin Masinter, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 557 days.

(21) Appl. No.: 09/733,160

(22) Filed: Dec. 8, 2000

(65) Prior Publication Data

US 2002/0071136 A1 Jun. 13, 2002

(51) Int. Cl.[7] .................................................. H04N 1/00
(52) U.S. Cl. ....................... 358/402; 358/407; 358/442; 358/462; 382/317; 382/232
(58) Field of Search ............................... 358/402, 403, 358/407, 440, 442, 462; 382/317, 312, 232, 233

(56) References Cited

U.S. PATENT DOCUMENTS

| | | | |
|---|---|---|---|
| 5,115,326 A | * 5/1992 | Burgess et al. ............. | 358/440 |
| 5,812,278 A | 9/1998 | Toyoda et al. .............. | 358/402 |
| 5,991,469 A | 11/1999 | Johnson et al. ............ | 382/317 |
| 6,424,426 B1 | * 7/2002 | Henry ........................ | 358/1.15 |

OTHER PUBLICATIONS faxaway.com Web site [retrieved from the Internet at http://www.faxaway.com/ on Dec. 4, 2000].
Onebox.com Web site [retrieved from the Internet at http://www.onebox.com/ on Dec. 7, 2000].
"Terminology and Goals for Internet Fax" [retrieved from the Internet at http://www.ietf.org/rfc/rfc2542.txt on Dec. 8, 2000].
FAQ: How can I send a fax from the Internet? [retrieved from the Internet at http://www.savetz.com/fax/ on Dec. 8, 2000].

* cited by examiner

*Primary Examiner*—Edward Coles
*Assistant Examiner*—Heather D Gibbs
(74) *Attorney, Agent, or Firm*—Nixon Peabody LLP

(57) ABSTRACT

A method, apparatus and computer-readable medium for converting messages includes stations coupled to facsimile devices and to client machines by a network to allow users at the client machines to communicate with users at the facsimile devices. In addition, the stations include processors for extracting information from messages sent by users at the facsimile devices and received by the stations, using the extracted information to convert the messages, and sending the converted messages through the network to the users at the client machines.

21 Claims, 7 Drawing Sheets

FIG. 6

SYSTEM AND METHOD FOR PROVIDING COMMUNICATIONS

FIELD OF THE INVENTION

This invention relates generally to a method and system for data communications and, more particularly, to allowing facsimile users to communicate with e-mail users.

BACKGROUND OF THE INVENTION

In recent years, the world has seen an unprecedented increase in the use of e-mail for everyday communications. Since many people own or have access to personal or portable computers at work or at home, e-mail provides a swift and convenient medium for people to communicate with each other. Electronic mail communications can be used in a number of capacities, such as for sending simple messages or transferring files (e.g., word processing documents, graphic images, program applications, etc.).

E-mail is often useful in transferring electronic documents that can be printed by recipients using conventional equipment. Generally, the business world has enjoyed being able to almost instantaneously send documents (e.g., a contract) to recipients via e-mail to be printed-out and executed. However, one of the several limitations of e-mail includes requiring that the intended recipients have access to some sort of device for accessing their e-mail accounts for retrieving messages including, for example, personal computers, lap-top computers or palm-top computers.

Facsimile devices have also played an important role in the business community. Such devices have been used for some time and are useful for sending simple messages or transferring copies of documents. Nevertheless, facsimile devices do have their limitations. For example, facsimile devices are often expensive or lack portability. In addition, people desiring to send messages or copies of documents using facsimile devices must have access to such devices and an intended recipient's corresponding facsimile device phone number.

Heretofore, people only having access to facsimile devices have not been able to send messages directly to people only having access to e-mail. Such a situation often occurs when people travel. There is a manner for people who only have access to e-mail to communicate with people only having access to facsimile devices. Such e-mail access-only persons may print-out their e-mail message and send a copy of the message via facsimile to their intended recipient.

Additionally, there are Internet service providers that allow people to send e-mail messages to recipients having access to facsimile devices. Using these types of services, the originally sent e-mail messages are received by the recipients as facsimiles. One such service includes Faxaway®, a service provided at www.faxaway.com by International Telecom Ltd., a privately-held corporation based in Seattle, Wash., which allows people having access to e-mail to send messages to people having access to facsimile devices, which is hereby incorporated by reference in its entirety. These e-mail messages include, in the message address field, an address in the following format: facsimile-phone-number@faxaway.com.

However, the services mentioned above do not provide a manner for the facsimile recipients to send a response or send a new message to persons only having access to ordinary e-mail such as those normally provided at user work places, or through e-mail providers including AOL®, Yahoo® and HotMail®. It should be noted that the terms "ordinary e-mail," "e-mail" or "electronic mail," or variations thereof, are contemplated in this disclosure as being equivalent terms, and thus should be interpreted as such.

SUMMARY OF THE INVENTION

A method for converting messages in accordance with the present invention includes extracting information from a first message received through a facsimile communication medium, using the extracted information to convert the message, and sending the converted message through a network communication medium.

The method in accordance with the present invention provides a number of advantages, including allowing users having access only to a facsimile device to communicate with users having access to e-mail without requiring the facsimile or e-mail users to possess or utilize any special hardware or software.

A system for converting messages in accordance with the present invention includes stations coupled to a facsimile communication medium and a network communication medium, processors coupled to the stations for executing a program of instructions for extracting information from a first message received by the stations through the facsimile communication medium, using the extracted information to convert the message, and sending the converted message through the network communication medium.

The system in accordance with the present invention provides a number of advantages, including allowing users having access only to a facsimile device to communicate with users having access to e-mail without requiring the facsimile or e-mail users to possess or utilize any special hardware or software.

A program storage device readable by a machine tangibly embodying a program of instructions executable by the machine to perform a method of converting messages in accordance with the present invention includes extracting information from a first message received through a facsimile communication medium, using the extracted information to convert the message, and sending the converted message through a network communication medium.

The device in accordance with the present invention provides a number of advantages, including allowing users having access only to a facsimile device to communicate with users having access to e-mail without requiring the facsimile or e-mail users to possess or utilize any special hardware or software.

BRIEF DESCRIPTION OF THE DRAWINGS

FIG. 6 illustrates an exemplary facsimile message used in accordance with another embodiment of the present invention.

DETAILED DESCRIPTION OF THE INVENTION

Figure 1:
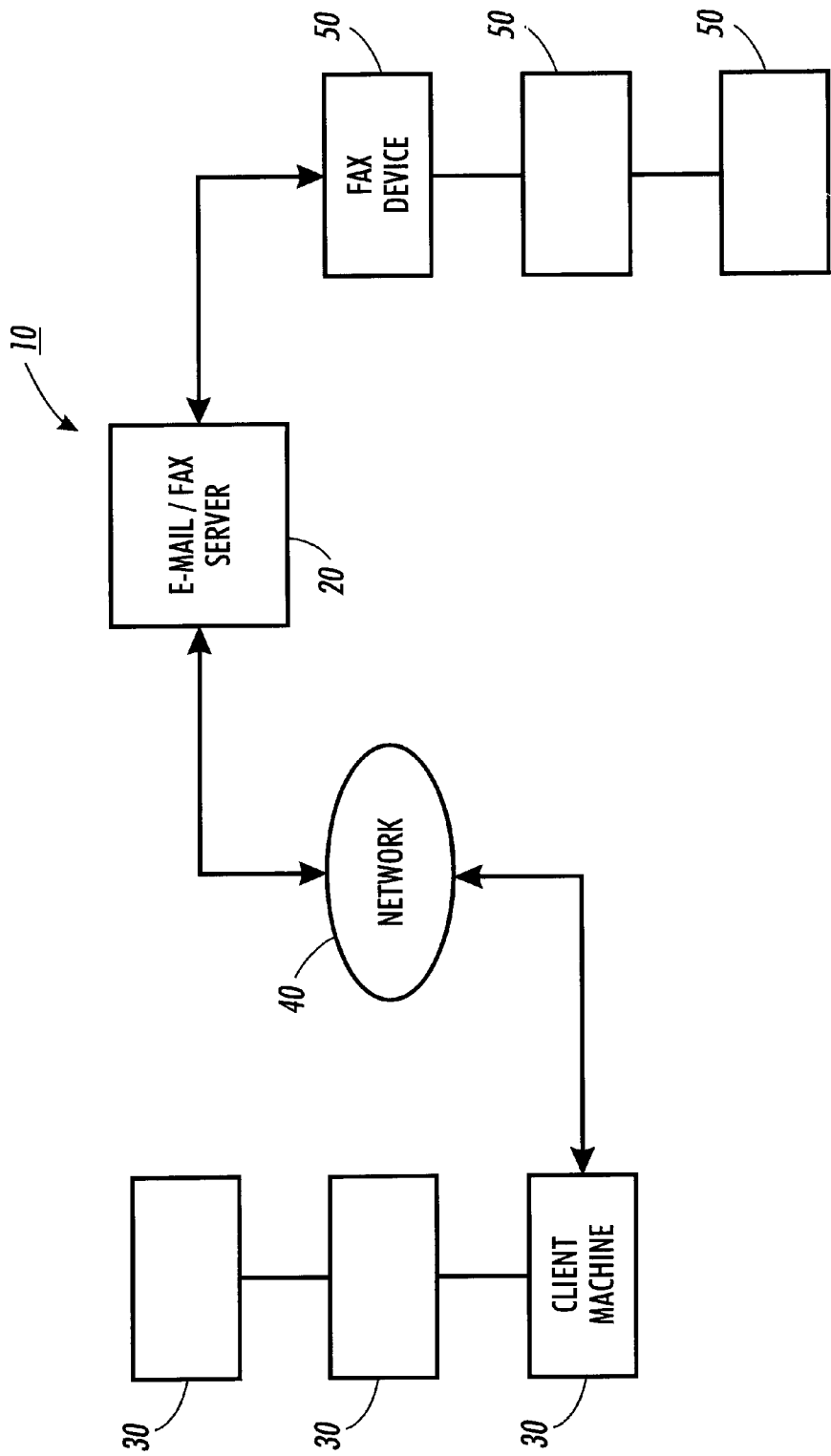
FIG. 1 is a block diagram illustrating a system for allowing facsimile users to communicate with e-mail users, in accordance with one embodiment of the present invention.

A communication system for allowing e-mail users to communicate with facsimile users in accordance with one embodiment of the present invention is illustrated in FIG. 1. The communication system includes fax devices 50 coupled to client machines 30 by network 40 and e-mail/fax server 20. One of the several features of the communication system is its ability to allow a facsimile user to send messages to e-mail users without requiring that either possess or utilize any special hardware or software.

Referring more specifically to FIG. 1, system 10 includes e-mail/fax server 20 coupled to client machines 30 by network 40, and coupled to fax devices 50, for allowing client machines 30 and fax devices 50 to communicate with each other.

In this particular embodiment, e-mail/fax server 20 is programmed with the instructions for allowing facsimile users to communicate with e-mail users in accordance with the present invention. E-mail/fax server 20 is coupled to network 40 of users, which are a plurality of client machines 30, although other types of systems could be used. Additionally, although one e-mail/fax server 20 is shown in this particular example, other types of small and large computer systems could be used in place of e-mail/fax server 20, such as connected to each other by a network such as a LAN, for example.

It should be appreciated that in various embodiments, client machines 30 can be personal desktop computers, lap-top computers, work stations, palm top computers, Internet-ready cellular/digital mobile telephones, dumb terminals or any other larger or smaller computer systems, for example. Moreover, client machines 30 may utilize many different types of platforms and operating systems, including, for example, Linux®, Windows®, CE®, MacIntosh®, Unix®, SunOS®, and variations of each. Also, while client machines 30 have varying processing capabilities in this and other embodiments described further herein, one requirement includes the capability of sending or receiving e-mail messages to other computers or networks (e.g., Internet). Moreover, although client machines 30 are shown separate from e-mail/fax server 20, it should be understood that a single computer (i.e., e-mail/fax server 20) could perform both of the client and server functions.

Further, each client machine 30 typically includes one or more processors (not illustrated), one or more memory storages (not illustrated) and one or more input/output devices including communication devices such as modems (not illustrated), for example. In this particular embodiment, client machines 30 are capable of loading and displaying e-mail interfaces retrieved from a computer-readable medium, for example, which can be situated in a computer system of client machines 30 or e-mail/fax server 20, discussed in more detail further below. Moreover, client machines 30 are capable of sending or receiving e-mail in various formats, such as in the MIME or S/MIME protocol, for example.

In addition, client machines 30 include display devices for displaying e-mail interfaces or Web pages through a conventional Web browser program, for example. In this particular embodiment, the display devices comprise conventional color computer monitors. However, monochrome, gray scale or a number of other different types of display devices are contemplated in other embodiments. Also, in other embodiments, client machines 30 can use conventionally known e-mail applications to generate, send, receive or display e-mail messages, including Microsoft Outlook®, Eudora® or AOL®, for example.

Further, network 40 can include hundreds of thousands of individual networks of computers such as the Internet, for example. Client machines 30 can access network 40 in a variety of ways, including using a conventional TCP/IP, xDSL, ISDN, or cable connection, for example. It should be noted that a variety of other communication systems and/or methods can also be used to couple e-mail/fax server 20 to each of the users at client machines 30, such as, for example, a LAN, a WAN, a dial-up connection through a PBX, wireless communication technology or information stored in a single computer using other communications protocols, etc.

Figure 2:
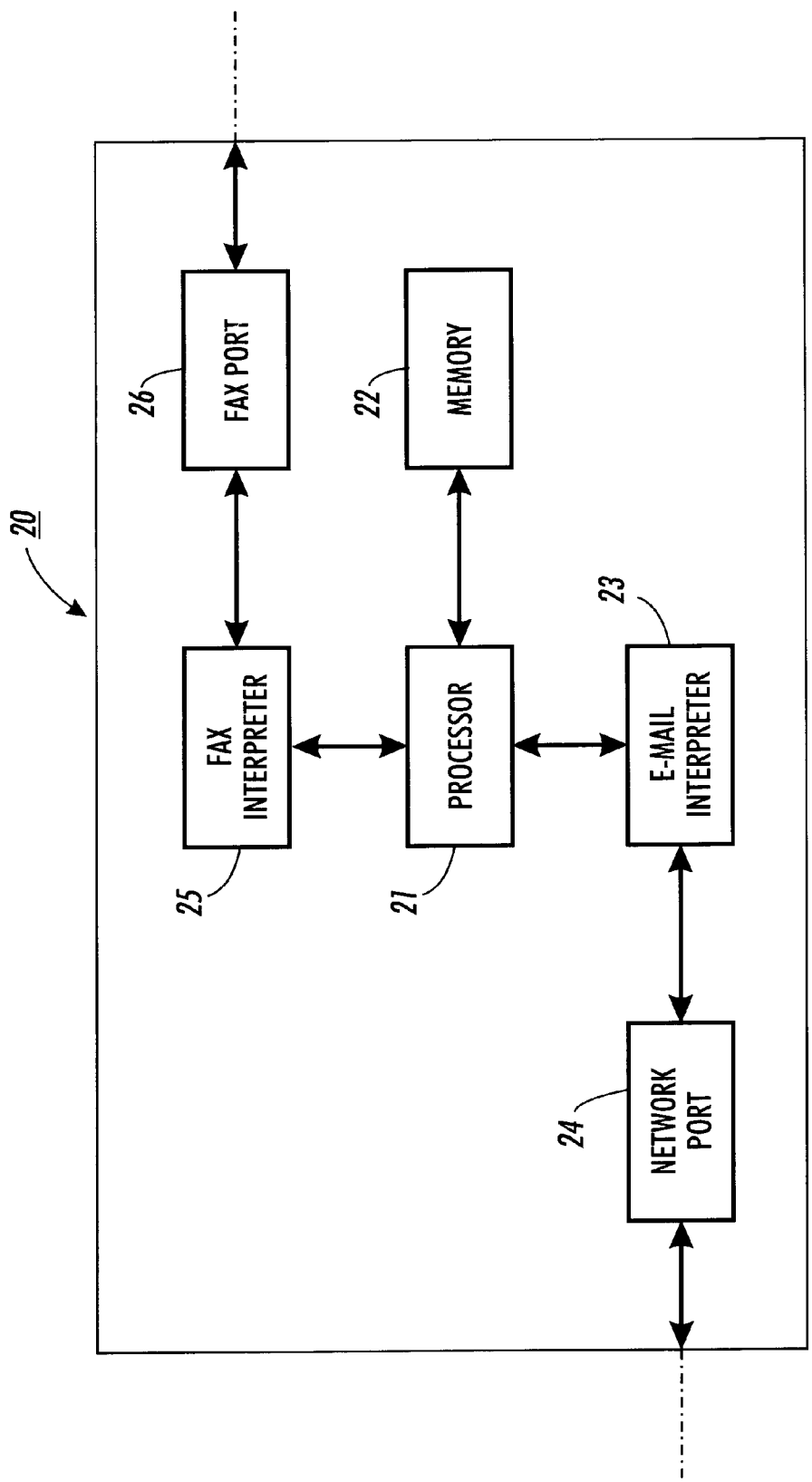
FIG. 2 is a block diagram illustrating an e-mail/fax server, in accordance with another embodiment of the present invention.

Referring now to FIG. 2, the components of e-mail/fax server 20 will now be discussed. In this particular embodiment, e-mail/fax server 20 includes processor 21, such as a central processing unit or other processing logic device. It should be appreciated that e-mail/fax server 20 can include one or more processors 21, and they may be physically located within or exterior to e-mail/fax server 20. However, in this particular embodiment, processor 21 is situated within e-mail/fax server 20 as shown. Moreover, processor 21 can include hardware, such as circuitry, configured to perform the method of allowing facsimile users to communicate with e-mail users, or software including instructions for performing the same, in accordance with one embodiment of the present invention. Further, processor 21 executes the instructions for the method of allowing facsimile users to communicate with e-mail users in accordance with one embodiment of the present invention, as well as other instructions for other types of applications.

In this particular embodiment, e-mail/fax server 20 further includes fax interpreter 25, which is coupled to fax port 26 and processor 21. Processor 21 controls fax interpreter 25 for receiving facsimile messages through fax port 26 and performing the conversions for allowing the facsimile messages to be converted into e-mail messages by e-mail interpreter 23, as more fully described further down below. In addition, fax port 26 is coupled to one or more devices capable of sending or receiving facsimiles (not illustrated), and ultimately coupled to fax devices 50, in this particular embodiment. E-mail/fax server 20 also includes e-mail interpreter 23, which is coupled to and controlled by processor 21 and coupled to network port 24 for performing the conversions for allowing the e-mail messages received through network port 24 to be converted into facsimile messages, as described further below. In addition, e-mail/fax server 20 includes memory 22 coupled to processor 21 for storing data and other information and allowing processor 21 to retrieve stored data or other information as becomes necessary during the processing of e-mail messages and facsimile messages as described further below.

Thus, fax interpreter 25 converts e-mails received by e-mail/fax server 20 into facsimile messages to be sent through fax port 26 in this particular embodiment. Moreover, e-mail interpreter 23 converts facsimile messages received by e-mail/fax server 20 into e-mail messages to be sent through network port 24 in this particular embodiment.

It should be appreciated each of the elements illustrated in FIG. 2 (i.e., the components included in e-mail/fax server 20) comprise separate software methodologies, which are logically coupled to each other in this particular embodiment. However, in other embodiments, each of the components mentioned above may comprise a single software methodology. Still further, each of the components mentioned above may comprise an individual or separate hardware components, such as circuitry configured to perform the various functions of each of the components described herein.

In this particular embodiment, memory 22 is coupled to e-mail/fax server 20, and specifically to processor 21, and comprises a computer-readable medium where system 10 stores the instructions and data utilized by the present invention. Although in this particular embodiment one memory 22 is shown, it should be understood that e-mail/fax server 20 can have multiple memories as needed or desired. Also, memory 22 is situated within e-mail/fax server 20 in this particular embodiment, but can be situated in a remote location from e-mail/fax server 20 in other embodiments. Moreover, memory 22 can be any type of storage, such as a data structure, random access memory (RAM), read-only memory (ROM), or other type of magnetic or optical reading and/or writing drive system that is coupled to e-mail/fax server 20 and which can store and be accessed by a processing system for the retrieval of information or data.

It should be noted that in other embodiments, memory 22, comprising a computer-readable medium, can be a portable memory device that is used on the client side (i.e., client machine 30) rather than the server side (i.e., e-mail/fax server 20). Examples of such computer-readable mediums, whether used on the client side or the server side, in accordance with one embodiment of the present invention, include floppy disks, hard disks, Zip® disks, CD-ROM's, DVD's, computer-readable cassette tapes or reels, or computer-readable punchcards, for example. Further, the instructions for performing the method of allowing facsimile users to communicate with e-mail users, in accordance with the present invention, are stored in memory 22, which again may comprise a computer-readable medium. In addition, memory 22 comprises a variety of storage devices, including local and network storage devices, depending on the particular network configuration used, in accordance with another embodiment of the present invention.

Referring generally to FIGS. 1–4, the basic operation of e-mail/fax server 20 for allowing users at client machines 30 and users at fax devices 50 to communicate with each other in accordance with practicing the present invention will now be discussed.

Figure 3:
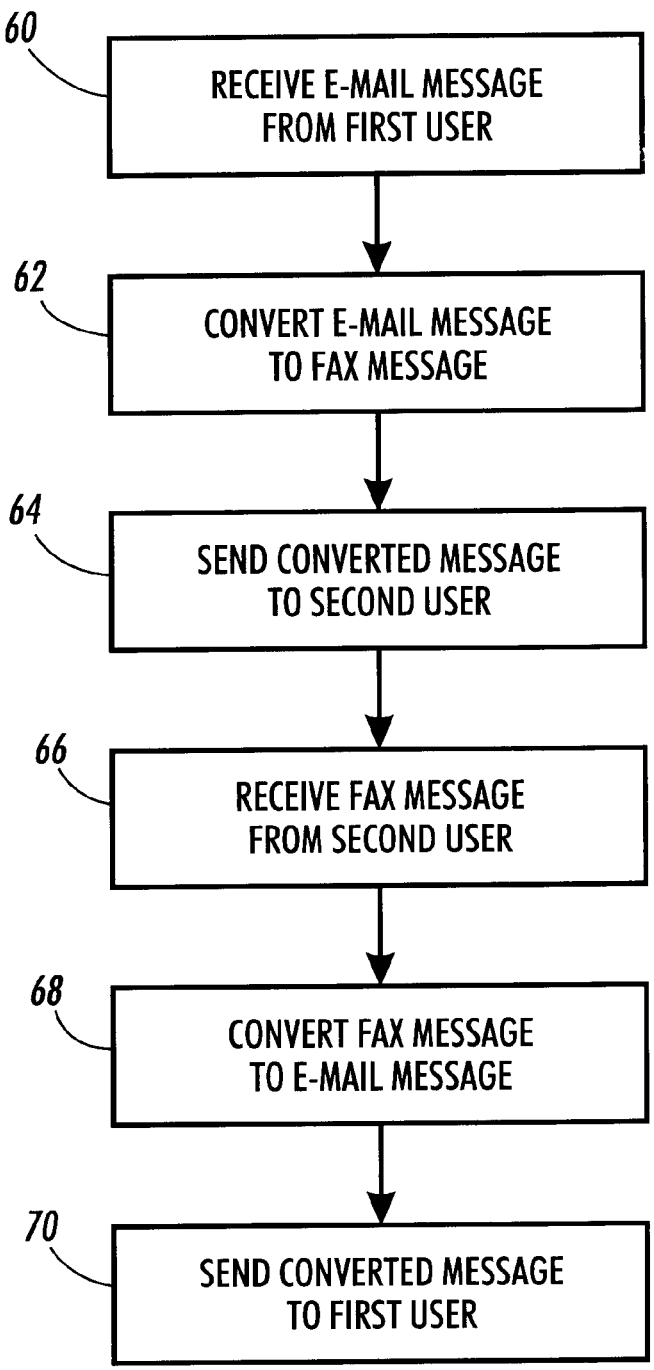
FIG. 3 is a flow chart of a process for allowing facsimile users to communicate with e-mail users, in accordance with another embodiment of the present invention.

Referring more specifically to FIG. 3, e-mail/fax server 20 receives e-mail messages sent from one or more users at client machines 30 through network 40, at step 60. At step 62, e-mail/fax server 20 converts received e-mail messages into facsimile messages, and at step 64, sends the converted messages to users at fax device 50. The e-mail messages sent through network 40 from users at client machine 30 to e-mail/fax server 20, and subsequently converted as described in detail further below, are received by users at fax device 50 as facsimile messages.

Users at fax device 50 can reply to received facsimile messages sent from users at client machines 30, or in the alternative, users at fax devices 50 can originate messages to be sent from fax device 50 to be received by one or more users at client machines 30 that are designated as recipients. Thus, at step 66, e-mail/fax server 20 receives a message through fax port 26 (i.e., a facsimile message) sent from fax device 50, where the message can comprise a reply to an e-mail message sent to fax device 50 from users at client machines 30 or new messages sent from users at fax device 50 intended for users at client machine 30. At step 68, e-mail/fax server 20 converts the received facsimile message into an e-mail message, and at step 70, sends the converted message to the e-mail user (i.e., intended recipient) at one or more of client machines 30.

Figure 4:
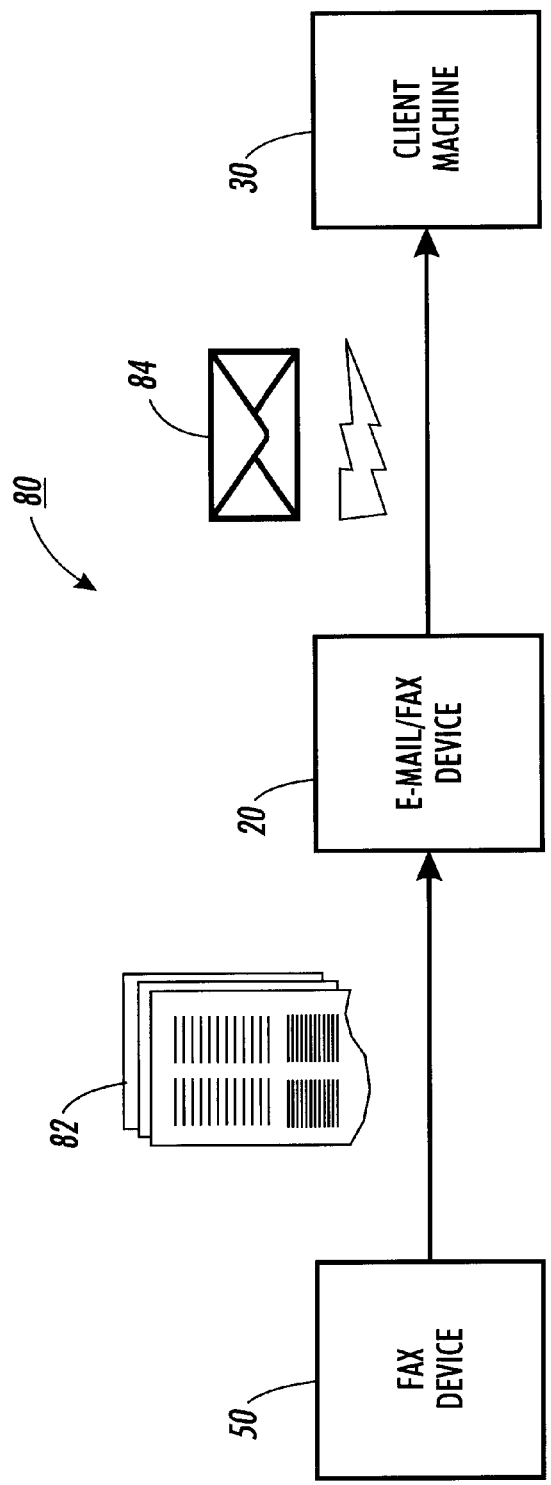
FIG. 4 is a block diagram illustrating the general components involved during a facsimile to e-mail communication, in accordance with another embodiment of the present invention.

Referring more specifically to FIG. 4, an exemplary communication 80 between a user at fax device 50 and a user at client machine 30 is illustrated. In this particular embodiment, users at fax device 50 who want to communicate with users at client machine 30 through network 40 (not illustrated) create and send facsimile message 82 to a phone number associated with e-mail/fax server 20. It should be noted that one or more phone numbers can be associated with e-mail/fax server 20 in this and in other embodiments. Moreover, the particular phone number, which is associated with e-mail/fax server 20, can also be logically linked to one or more fax devices 50 by e-mail/fax server 20 using look-up tables, or relational databases, for example. In this particular embodiment, facsimile message 82 contains encoded information that includes, for example, information that identifies the message's intended recipient at client machine 30, as discussed further below.

Once e-mail/fax server 20 receives facsimile message 82, it converts the message into electronic mail message 84 and forwards it to the recipient at client machine 30 that is identified in the encoded information, for example.

Figure 5:
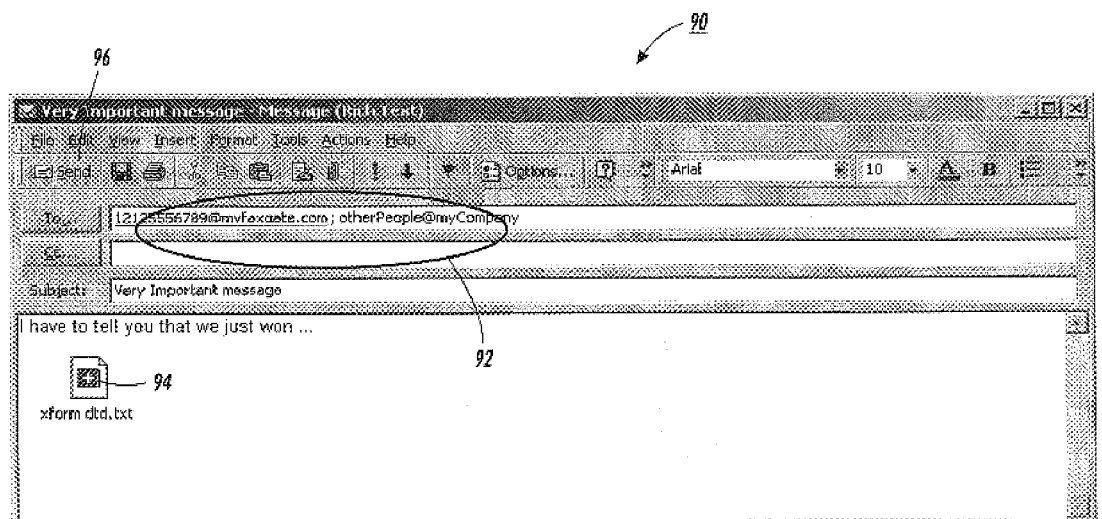
FIG. 5 illustrates an exemplary e-mail message sent from an e-mail user to a facsimile user used in accordance with another embodiment of the present invention.
Figure 6:
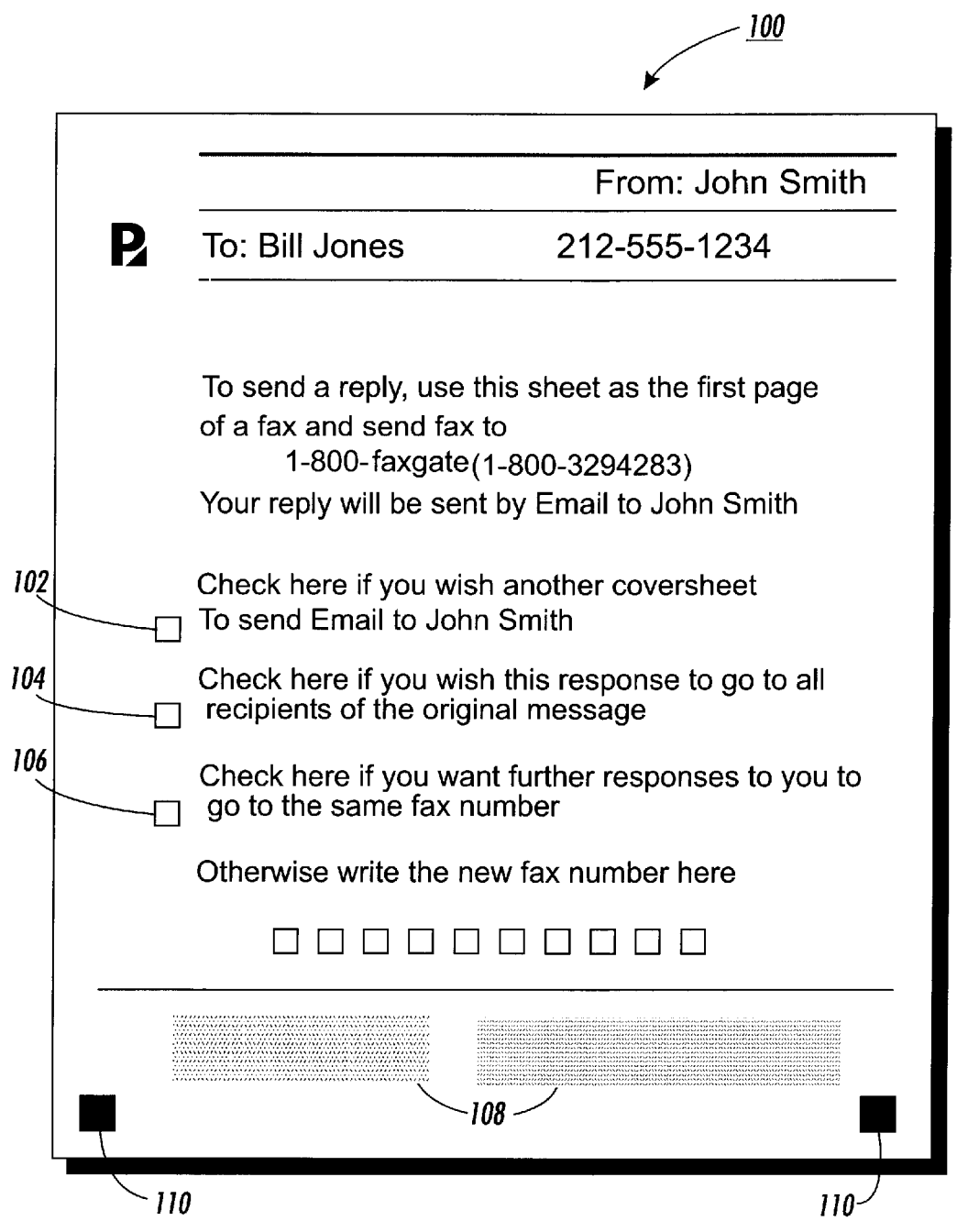
Figure 7:
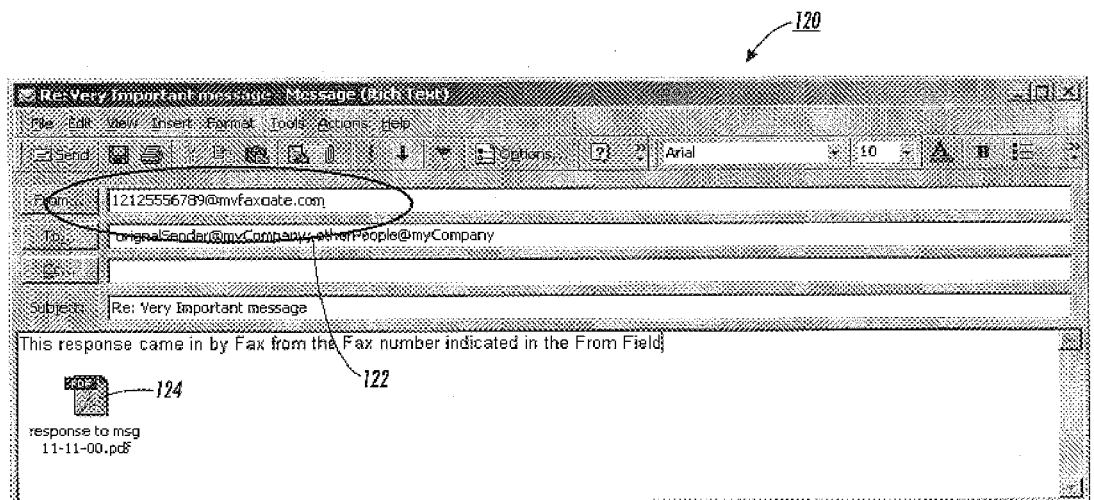
FIG. 7 illustrates an exemplary e-mail message received by an e-mail user containing a message sent by a facsimile user used in accordance with another embodiment of the present invention.

Referring generally to FIGS. 5–7, with occasional references to FIGS. 1–4 described above, a more detailed discussion is provided below of the operation of e-mail/fax server 20 for performing a process of allowing users at client machines 30 and users at fax devices 50 to communicate with each other in accordance with several embodiments of the present invention. It should be noted that the ensuing discussion begins with the case where users at client machines 30 initiate communications with users at fax devices 50. However, it should be appreciated, as described above with respect to FIG. 4, that alternatively or concurrently, a user at fax device 50 can initiate communication with one or more users at client machines 30, for example, using earlier instances of cover sheets to forward a new response. In other embodiments, a user at fax device 50 uses prefabricated cover sheets comprising recipient information encoded thereon to initiate a communication with one or more users at client machine 30.

Referring specifically now to FIG. 5, a user at client machine 30 begins by creating the illustrated, exemplary e-mail message 90, in accordance with another embodiment of the present invention. In this particular embodiment, users create e-mail message 90 for sending to one or more users at one or more fax devices 50. Users enter one or more addresses in "To" field 92, including one or more standard e-mail addresses or one or more e-mail addresses associated with e-mail/fax server 20. As shown in "To" field 92, e-mail/fax server 20 is associated with a particular domain name such as www.myfaxgate.com, for example. Moreover, users enter their intended recipients' facsimile phone numbers (i.e., the phone number associated with fax device 50), in accordance with this particular embodiment of the present invention. Thus, for example, if a phone number (e.g., 1-212-555-6789) is associated with one or more fax devices 50, a user at client machine 30 would enter in "To" field 92 the following e-mail address: 12125556789@myfaxgate-.com. In other embodiments, users enter additional e-mail addresses or additional recipients at fax device 50, for example.

In another embodiment of the present invention, e-mail message 90 includes attached file 94, which may include files in a number of formats, including text or image file formats, for example. In other embodiments, e-mail message 90 includes a user's entire message without attaching any files thereto. In other embodiments, e-mail message 90 includes HTML formatting such as, for example, highlighted text, fields for accepting user input or any other formatting conventionally known in the art, which e-mail/fax server 20 can subsequently use to generate a facsimile cover sheet, as described in detail further below. In yet another embodiment, e-mail message 90 includes instructions coded in the FlowPort® form language, which can also be subsequently used by e-mail/fax server 20 to generate a facsimile cover sheet.

Once e-mail message 90 is complete, according to the user's satisfaction, the user causes it to be sent from client machine 30 to e-mail/fax server 20 by clicking on "Send" button 96 using a conventional pointer device such as a mouse, for example. Client machine 30 transmits e-mail message 90 through network 40 to e-mail/fax server 20 using conventional e-mail protocols, routing and transmission techniques.

In this particular embodiment, e-mail/fax server 20 receives e-mail message 90 through network port 24 (FIG. 2). Processor 21 controls e-mail interpreter 23 for processing the body of e-mail message 90, and any attachments thereto (i.e., attached file 94). In particular, in this embodiment, e-mail interpreter 23 converts e-mail message 90, and any corresponding attachments, into an image format suitable for faxing, using conventional file formatting techniques, for example.

In another embodiment of the present invention, e-mail/fax server 20 processes the above-mentioned image format version of e-mail message 90 so that it can be sent through fax port 26 en route to one or more fax devices 50. In particular, processor 21 controls fax interpreter 25 to construct a facsimile cover sheet. In this particular embodiment, fax interpreter 25 constructs the facsimile cover sheet by incorporating the above-mentioned image format version of e-mail message 90.

It should be appreciated that in this particular embodiment, fax interpreter 25 constructs the facsimile cover sheet so that it can be subsequently interpreted by e-mail/fax server 20 in the event that a user at one or more fax devices 50 transmits it back to e-mail/fax server 20 (i.e., a user at fax device 50 sends a reply). In that case, as will be described more fully further below, e-mail/fax server 20, using fax interpreter 25, extracts information from received facsimile messages that were originally sent from e-mail/fax server 20 to a user at one or more fax devices 50 using the methodology described above. Such information includes identifying information associated with the sender of the facsimile (i.e., the user at one or more fax devices 50), as well as other information that will be further described below, for example.

Referring now to FIG. 6, an exemplary facsimile message 100 (i.e., facsimile cover sheet) is shown in accordance with another embodiment of the present invention. In this particular embodiment, facsimile message 100 includes processing instructions associated with the message contained therein. The information is encoded in data glyphs 108 on the face of facsimile message 100.

In this particular embodiment, data glyphs 108 are two dimensional bar codes that can encode digital information, as described in U.S. Pat. No. 5,991,469, the disclosure of which is totally incorporated herein by reference. However, it should be appreciated that bar codes or any other techniques for encoding data can be used in other embodiments as well. However, in this particular embodiment, data glyphs 108 are utilized because they possess error resistant qualities and are amenable to being used in facsimiles without losing the capability of storing encoded data that can still be interpreted by e-mail/fax server 20 after being transmitted. Moreover, data glyphs 108 also retain their error resistant qualities after repeated facsimile transmissions. Thus, facsimile message 100 is reusable and can be reused to send any number of messages that will ultimately be transformed into e-mails to users at client machines 30.

In another embodiment of the present invention, the information encoded in data glyphs 108 includes a return address of the users at client machine 30 and/or at fax device 50, and any processing instructions for converting a reply from either, for example. In this particular embodiment, the processing instructions can include instructions for forwarding a reply back to one or more users at client machine 30 as e-mail having an attached file in the GIF image file format, for example.

In another embodiment of the present invention, in the case where a user at fax device 50 is originating a message instead of replying to a message from a user at client machine 30, the user can request services using facsimile messages 100, for example, by including their requests in facsimile message 100. Users at fax device 50 indicate on facsimile message 100, by hand-writing, for example, specific services they would like rendered that are available on the Internet. For instance, the user could hand-write a request to purchase a specific book from www.amazon.com. Then, once facsimile message 100 is received by e-mail/fax server 20, administrators at e-mail/fax server 20 could visually inspect facsimile message 100 and forward the user's (i.e., user at fax device 50) request to the appropriate party. In this particular embodiment, the appropriate party can include an Internet Web site (i.e., www.amazon.com) or another entity, such as a pizzeria. In other embodiments, e-mail/fax server 20 includes applications that are used for performing Optical Character Recognition ("OCR") to interpret the user's handwritten requests.

In another embodiment of the present invention, a user at fax device 50 could indicate their requests on facsimile message 100 by checking check-boxes on a prefabricated, custom version of facsimile message 100. E-mail/fax server 20 can be configured to recognize which of the check-boxes the user has selected, for example. Still further, the specific types of requests, such as those mentioned above, could be encoded in data glyphs 108, for example, which is interpreted by e-mail/fax server 20 in the manner described herein. In this particular embodiment, once e-mail/fax server 20 detects which check-boxes have been selected by the user, it interprets the corresponding data glyph 108 to determine the type of service requested and fulfills the request in the manner described above.

In another embodiment of the present invention, facsimile message 100 has printed thereon, in English or in another human language, for example, instructions directed to a user at fax device 50 for returning a message back to the user at client machine 30. In yet another embodiment, facsimile message 100 includes a facsimile telephone number associated with e-mail/fax server 20.

Once e-mail/fax server 20 has constructed facsimile message 100, it is stored in memory 22 in a data structure or file, for example. In this particular embodiment, if a device capable of sending facsimiles is available, processor 21 accesses memory 22 to retrieve the stored facsimile cover sheet and sends it to through fax port 26 to be transmitted to the intended fax device 50 using one of the devices capable of sending facsimiles. In other embodiments, if at the time the facsimile cover sheet has been constructed by fax interpreter 25 and a device capable of sending facsimiles is available, it is sent immediately through fax port 26 to be transmitted to the intended recipient at fax device 50.

When the intended users at one or more fax devices 50 receive facsimile message 100, they can review it and act accordingly. For example, the user may want another facsimile message 100 for sending e-mail to the sender (i.e., the user at client machine 30), and thus would mark check-box 102. In another embodiment, the user may want to respond to the message contained in facsimile message 100, which was originally sent by one or more users at client machines 30, and include all of the recipients of the original message. Thus, the user could mark check-box 104. In yet another embodiment, the user may indicate that they want subsequent messages intended for them to be sent to the same phone number associated with fax device 50 by marking check-box 106. In other embodiments, the particular location of check-boxes 102–106, for example, can also be stored in data glyphs 108 on facsimile message 100, so that e-mail/fax server 20 can determine whether check-boxes 102–106 have indeed been checked, and therefore can perform the requested actions.

After users have reviewed and entered information on facsimile message 100, if their input was requested or required, users then transmit facsimile message 100 to e-mail/fax server 20, where facsimile message 100 is destined for the intended recipients at one or more client machines 30.

In this particular embodiment, a user at fax device 50 places facsimile message 100 as the top sheet (i.e., cover sheet) along with any number of attached additional pages that form the message intended for a recipient at one or more client machines 30. The user then enters the phone number associated with e-mail/fax server 20 into fax device 50, which as mentioned above can be printed on the face of facsimile message 100. Then, the user causes fax device 50 to transmit facsimile message 100 to e-mail/fax server 20. E-mail/fax server 20 receives facsimile message 100 through one or more devices capable of receiving facsimile transmissions (not illustrated) that are coupled to e-mail/fax server 20.

In another embodiment of the present invention, e-mail/fax server 20, through fax interpreter 25, controlled by processor 21, identifies facsimile message 100 by detecting identification glyphs 110, and extracts the data or information encoded in data glyphs 108 to identify where to send any additional attached facsimile pages that are contained in facsimile message 100. It should be noted that conventional devices capable of sending or receiving facsimile transmissions typically receive such facsimile transmissions in an electronic format. Thus, e-mail/fax server 20 receives an electronic version of facsimile message 100 through fax port 26 from one or more of the devices capable of sending or receiving facsimile transmissions that are coupled to e-mail/fax server 20 in this particular embodiment.

In another embodiment of the present invention, e-mail/fax server 20 extracts the information encoded in data glyphs 108 using the DataGlyph® and FlowPort® technology, developed by the assignee hereof, and U.S. Pat. No. 5,991,469, assigned to the assignee hereof, the disclosure of which is totally incorporated by reference. In this particular embodiment of the present invention, the devices capable of sending or receiving facsimile transmissions that are coupled to e-mail/fax server 20 can be programmed with the DataGlyph® and FlowPort® instructions, incorporated by reference herein, for extracting the information encoded in data glyphs 108 as each facsimile message 100 is received. In other embodiments, the DataGlyph® and FlowPort® instructions are stored in memory 22 and executed by processor 21 using fax interpreter 25.

As described above, data glyphs 108 can contain the name and e-mail address of the originator of facsimile message 100 in the case where facsimile message 100 represents a reply to a message originally sent from one or more users at client machines 30 to one or more users at fax devices 50. Also mentioned above, facsimile message 100, when received by e-mail/fax server 20, includes any number of attached facsimile pages. The attached facsimile pages, if there are any, form a message from one or more users at fax device 50 in this particular embodiment. Moreover, the attached facsimile pages can include previous messages and/or replies between the user at fax device 50 and the user at client machine 50, for example. However, in other embodiments, facsimile message 100 forms a complete message sent from one or more users at fax devices 50.

In another embodiment of the present invention, fax interpreter 25 uses conventional OCR processes and/or devices capable of performing OCR to extract information contained in data glyphs 108 from facsimile message 100. In yet another embodiment, where data glyphs 108 are not utilized in facsimile message 100, fax interpreter 25 performs OCR on facsimile message 100 to extract the information associated with the message.

In another embodiment of the present invention, the attached facsimile pages received with facsimile message 100 are converted into one or more of several standard file formats by e-mail interpreter 23 using conventional file conversion techniques. In this particular embodiment, such standard file formats include PDF, PostScript, text, HTML, XTML, GIF or JPEG, for example. Thus, e-mail/fax server 20 generates e-mail using e-mail interpreter 23 controlled by processor 21. The e-mail is generated by e-mail interpreter 23 by including the e-mail addresses of the persons identified in data glyphs 108, for example.

It should be noted that in this particular embodiment, as well as in other embodiments of the present invention, e-mail/fax server 20 generates the e-mail based upon the data contained in data glyphs 108. In particular, if data glyphs 108 contain formatting information, according to at least one embodiment of the present invention, then e-mail interpreter 23 uses the formatting information in generating the e-mail. Still further, if data glyphs 108 contain recipient address information, according to at least one embodiment of the present invention, then e-mail interpreter 23 uses the formatting information in generating the e-mail as well.

In another embodiment of the present invention, the attached facsimile pages received with facsimile message 100 that were converted into one or more of several standard file formats, as described above in another embodiment, are included in the e-mail as an attachment. Then, e-mail/fax server 20 sends the e-mail through network port 24 to the recipients at one or more client machines 30 identified in data glyphs 108 using conventional e-mail protocols, routing and transmission techniques.

Referring now to FIG. 7, an exemplary electronic mail message 120 (i.e., the facsimile message sent from one or more users at fax devices 50) received by a user at client machine 30 is shown in accordance with another embodiment of the present invention. The e-mail address associated with e-mail/fax server 20 that in turn is associated with the sender (i.e., user at fax device 50) of electronic mail message 120 is included in "From" field 122. In addition, the message received from a user at fax device 50 is included in electronic mail message 120 as facsimile file attachment 124. In this particular embodiment, the user at client machine 30 opens facsimile file attachment 124 using conventional e-mail plug-in modules, such as Adobe Acrobat® in the case where facsimile file attachment 124 is in the PDF format, for example. In another embodiment, the message sent from a user at fax device 50 is included directly in the body of electronic mail message 120 (i.e., not as a separate file attachment).

Users at client machines 30 can respond to electronic mail message 120 sent from a user at fax device 50, thus repeating the process described above in detail for allowing client machines 30 and fax devices 50 to communicate with each other.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method of converting messages, comprising:

extracting encoded information from a facsimile communicated through a facsimile communication medium, the encoded information having at least one recipient address information and at least one processing instruction thereon;

converting the facsimile to create an e-mail based upon the extracted encoded information; and transmitting at least a substantial portion of the e-mail to at least one recipient identified in the address information.

2. The method of claim 1 wherein the at least one recipient address information is based upon at least one recipient address information included in a prior e-mail.

3. The method of claim 1 wherein the encoded information further comprises at least one data glyph.

4. The method of claim 1 wherein the facsimile comprises at least one cover sheet having the encoded information thereon.

5. The method of claim 1 wherein Optical Character Recognition is used to interpret a user's handwritten request for services included in the facsimile, and executing the request.

6. The method of claim 1 wherein a user indicates on the facsimile the at least one recipient address information.

7. The method of claim 1 wherein the facsimile is originated from a facsimile device.

8. A system for converting messages, comprising:

at least one station coupled to a facsimile communication medium; and at least one processor coupled to the at least one station, the at least one processor for executing a program of instructions for extracting encoded information from a facsimile communicated through the facsimile communication medium, the encoded information having at least one recipient address information and at least one processing instruction encoded thereon, converting the facsimile to create an e-mail based upon the extracted encoded information, and transmitting at least a substantial portion of the e-mail to at least one recipient identified in the address information.

9. The system of claim 8 wherein the at least one recipient address information is based upon at least one recipient address information included in a prior e-mail.

10. The system of claim 8 wherein the encoded information further comprises at least one data glyph.

11. The system of claim 8 wherein the facsimile comprises at least one cover sheet having the encoded information thereon.

12. The system of claim 8 wherein Optical Character Recognition is used to interpret a user's handwritten request for services included in the first message, and executing the request.

13. The system of claim 8 wherein a user indicates on the facsimile the at least one recipient address information.

14. The system of claim 8 wherein the facsimile is originated from a facsimile device.

15. A program storage device readable by a machine tangibly embodying a program of instructions executable by the machine to perform a method of converting messages, comprising:

extracting encoded information from a facsimile communicated through a facsimile communication medium, the encoded information having at least one recipient address information and at least one processing instruction thereon;

converting the facsimile to create an e-mail based upon the extracted encoded information; and transmitting at least a substantial portion of the e-mail to at least one recipient identified in the address information.

16. The device of claim 15 wherein the at least one recipient address information is based upon at least one recipient address information included in a prior e-mail.

17. The device of claim 15 wherein the encoded information further comprises at least one data glyph.

18. The device of claim 15 wherein the facsimile comprises at least one cover sheet having the encoded information thereon.

19. The device of claim 15 wherein Optical Character Recognition is used to interpret a user's handwritten request for services included in the facsimile, and executing the request.

20. The device of claim 15 wherein a user indicates on the facsimile the at least one recipient address information.

21. The device of claim 15 wherein the facsimile is originated from a facsimile device.

* * * * *